Jan. 12, 1937  C. L. JONES ET AL  2,067,324
REFRIGERATING APPARATUS AND METHOD
Filed April 27, 1931   6 Sheets-Sheet 1
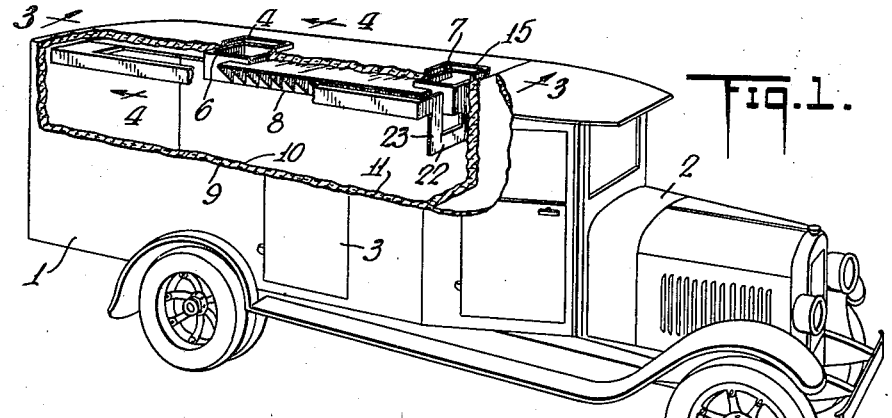
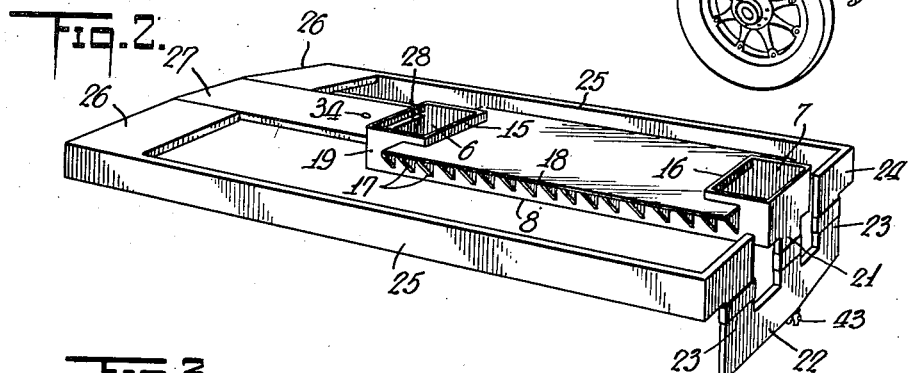
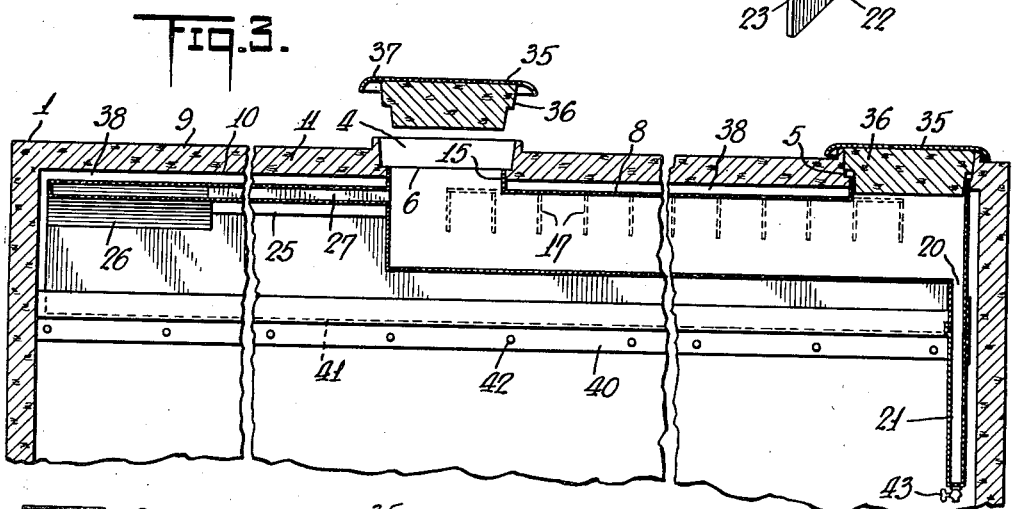
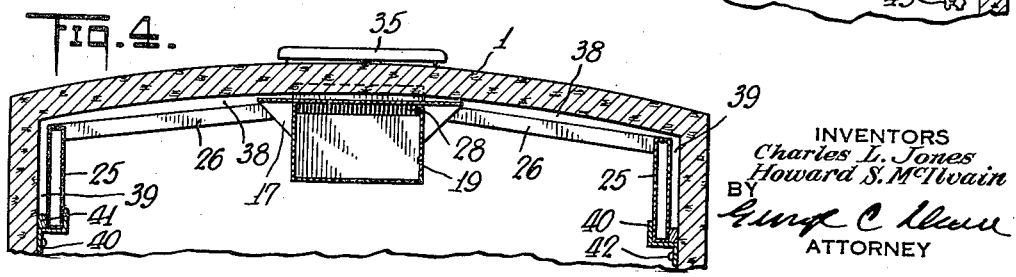
INVENTORS
Charles L. Jones
Howard S. McIlvain
BY
George C. Dunn
ATTORNEY

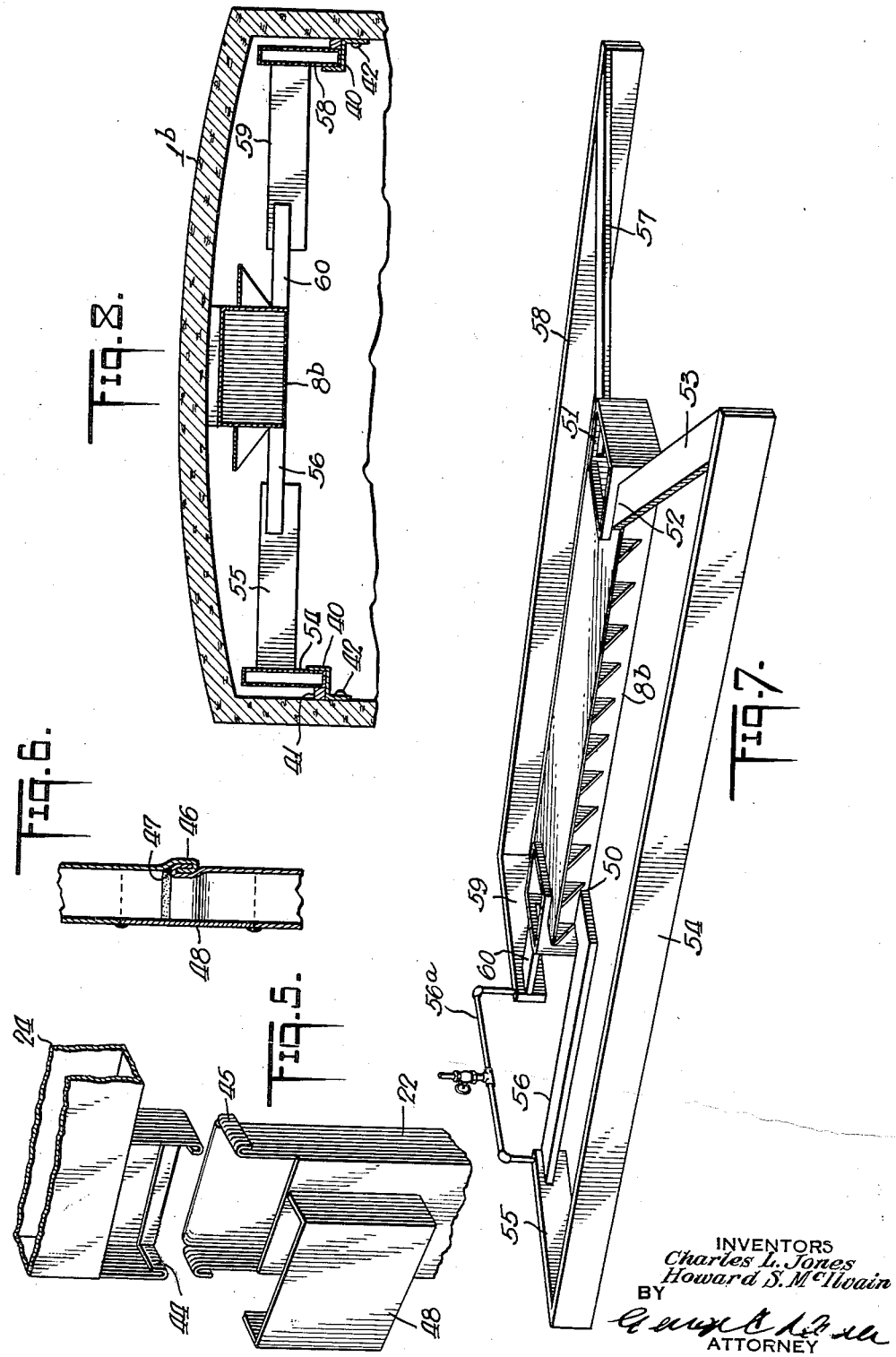

Jan. 12, 1937.  C. L. JONES ET AL  2,067,324
REFRIGERATING APPARATUS AND METHOD
Filed April 27, 1931  6 Sheets—Sheet 3
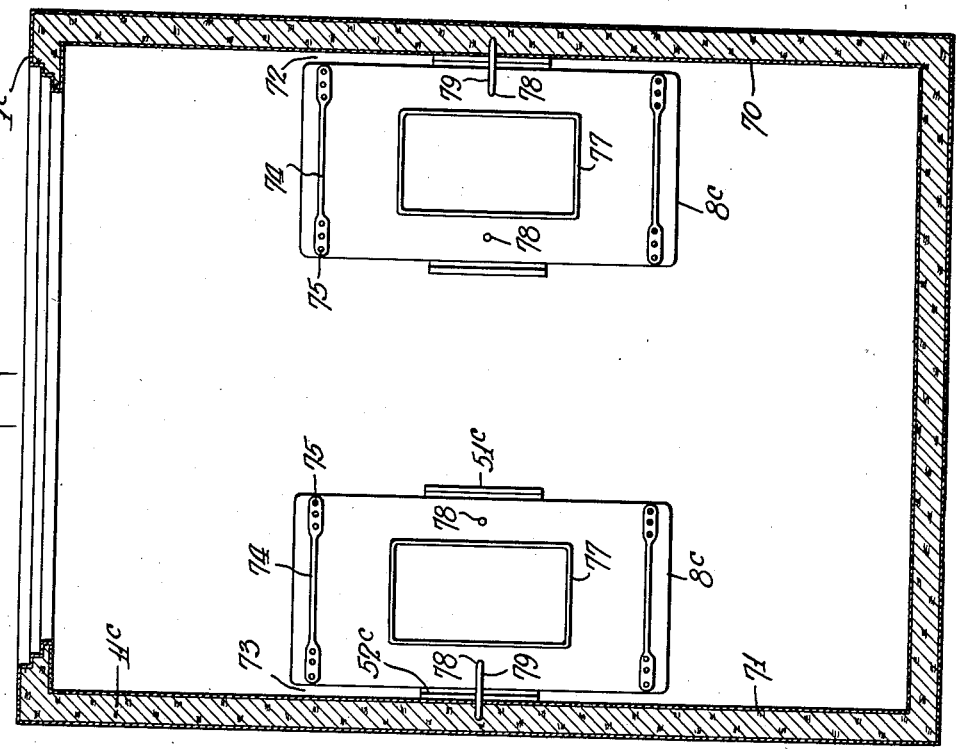
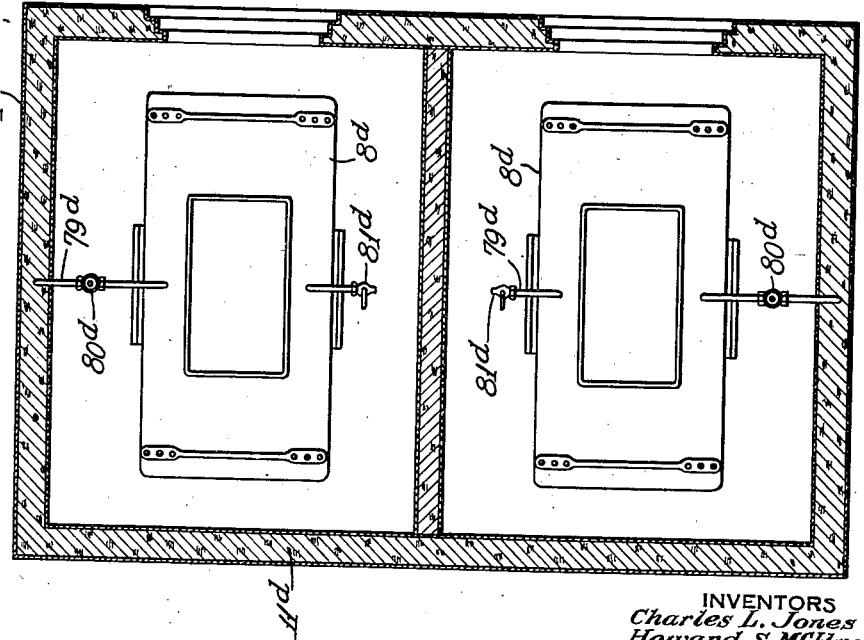
INVENTORS
Charles L. Jones
Howard S. McIlvain
BY
ATTORNEY Jan. 12, 1937. C. L. JONES ET AL 2,067,324
REFRIGERATING APPARATUS AND METHOD
Filed April 27, 1931 6 Sheets-Sheet 4
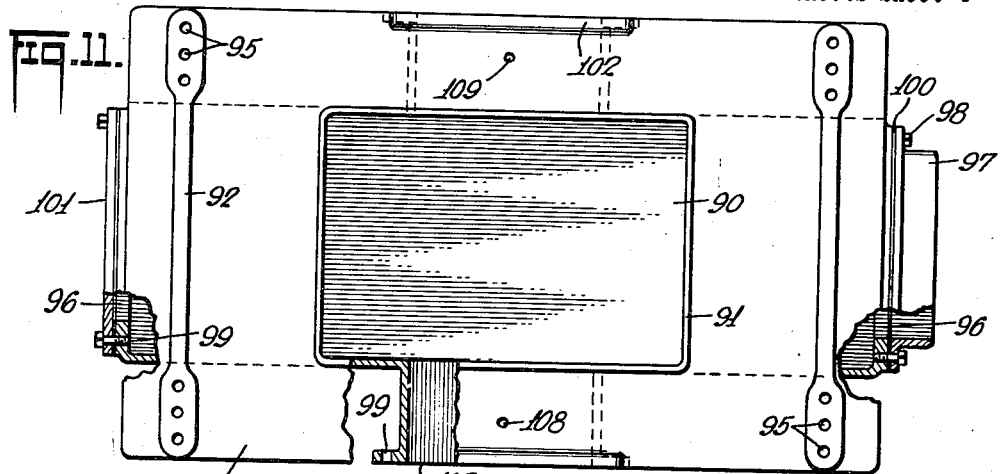
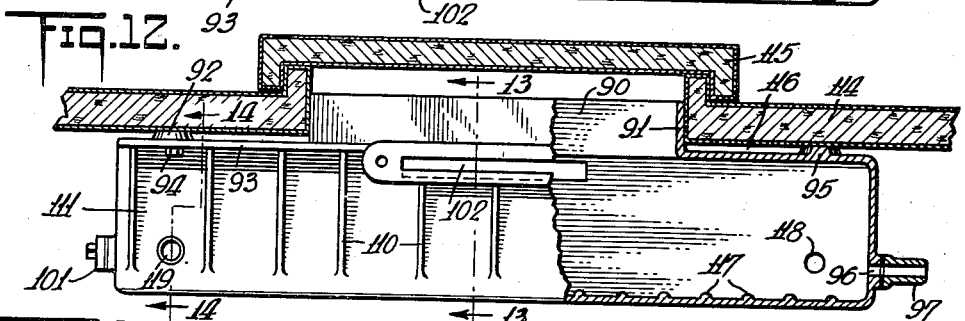
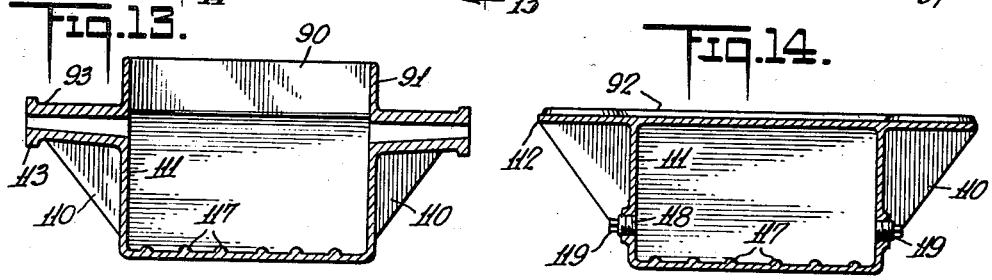
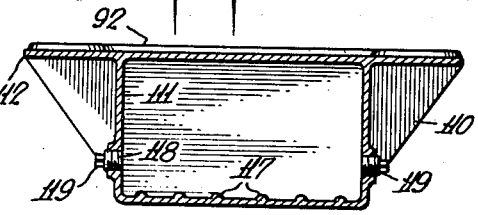
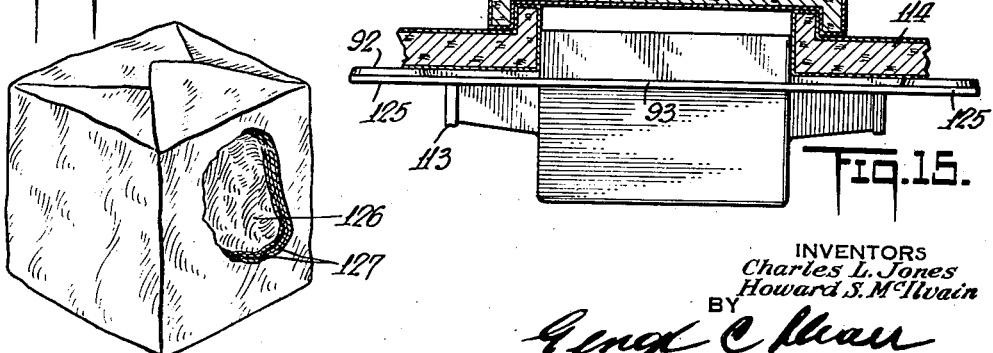
INVENTORS
Charles L. Jones
Howard S. McIlvain
BY
George C. Shaw
ATTORNEY Jan. 12, 1937.  C. L. JONES ET AL  2,067,324
REFRIGERATING APPARATUS AND METHOD
Filed April 27, 1931   6 Sheets-Sheet 5
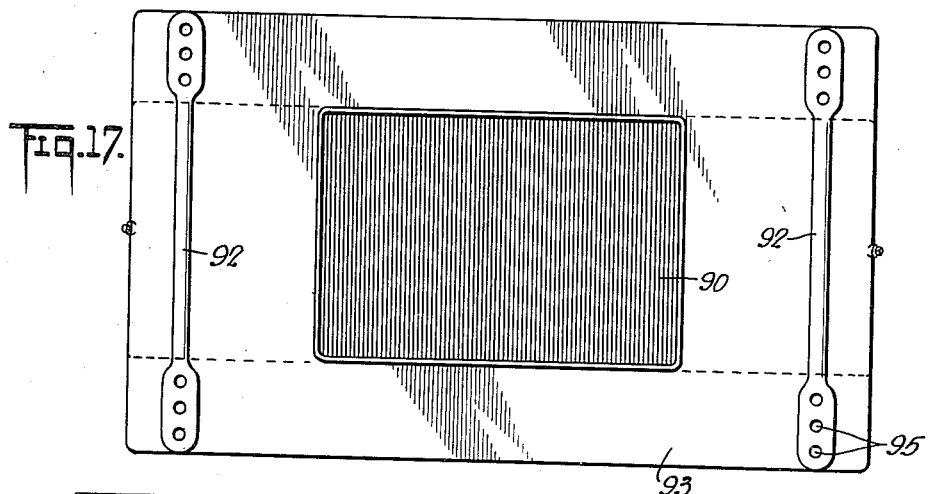
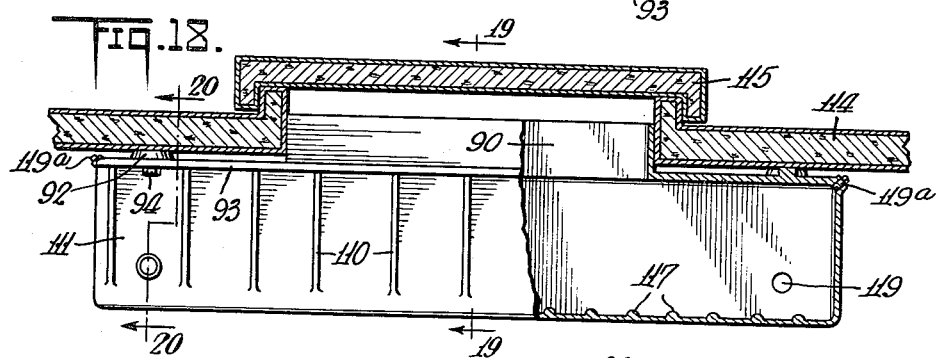
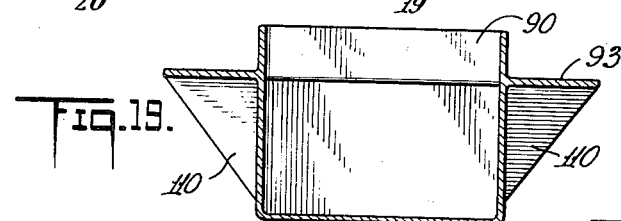
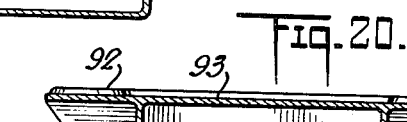
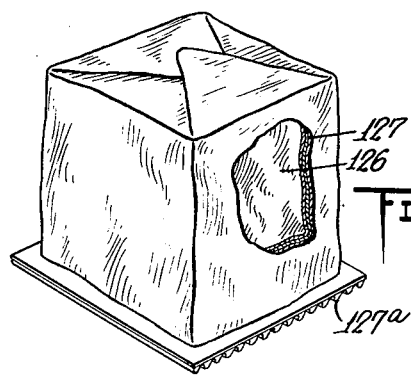
INVENTORS
Charles L. Jones
Howard S. McIlvain
BY
ATTORNEY

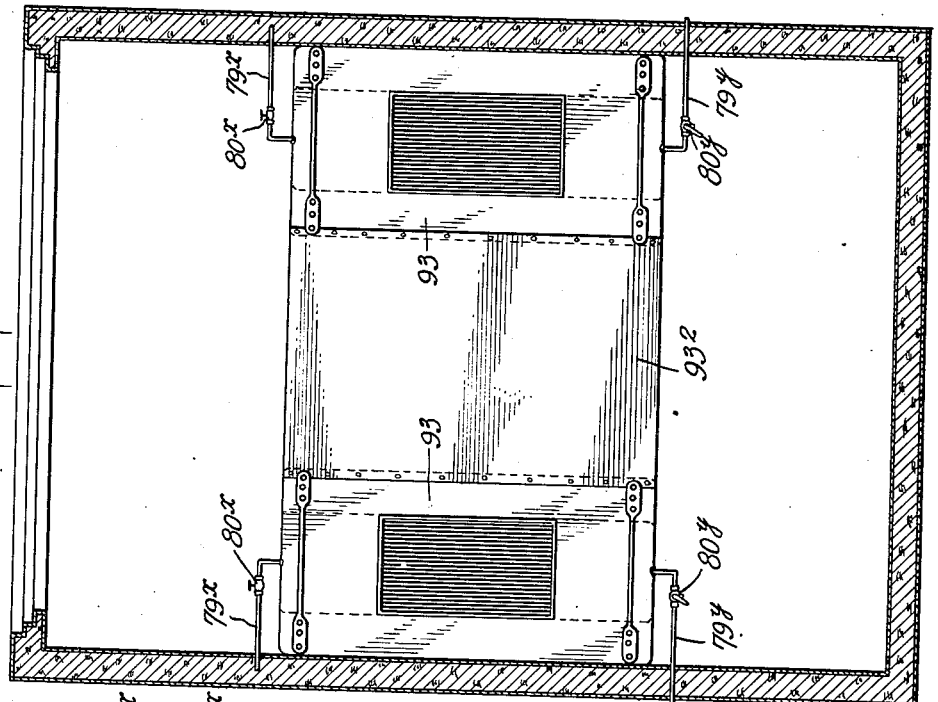
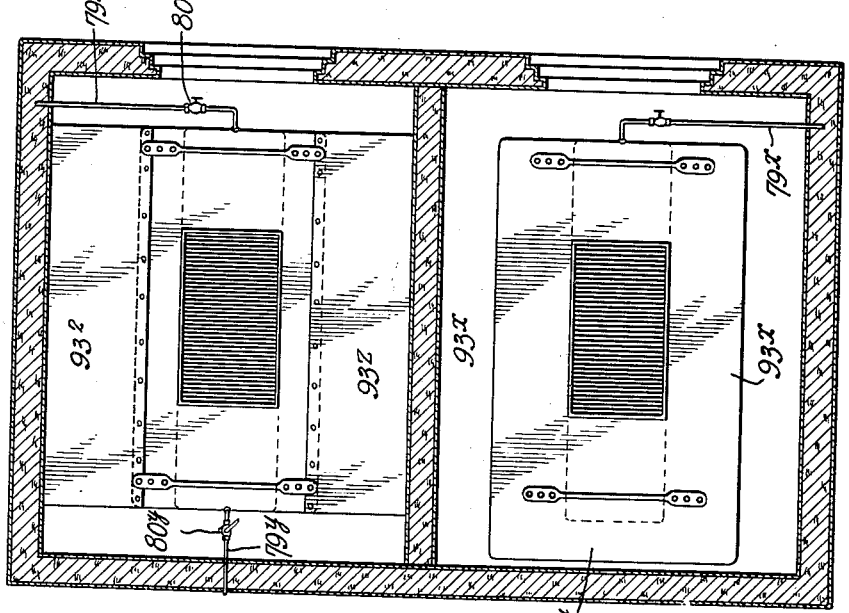

Patented Jan. 12, 1937

2,067,324

UNITED STATES PATENT OFFICE 2,067,324

REFRIGERATING APPARATUS AND METHOD

Charles L. Jones, Pelham, N. Y., and Howard S. McIlvain, Belleville, N. J., assignors, by mesne assignments, to Adico Development Corporation Application April 27, 1931, Serial No. 533,036

22 Claims. (Cl. 62—91.5)

Our present invention relates to refrigerating apparatus and methods particularly adapted for use in connection with solid carbon dioxide as the refrigerant. By our invention, we simplify the apparatus and make it readily adaptable for refrigerators of widely varying types and sizes, and for widely varying conditions of use of any refrigerator in which the invention has been embodied.

An important feature is to make the solid carbon dioxide and its container respond quickly and effectively for re-chilling the atmosphere of the refrigerator, when suddenly overheated as by frequent use of side-opening doors of refrigerated delivery trucks, but many of its features may be effectively utilized in other types of refrigerators, as for instance, household, display-case, or storage room refrigerators; also refrigerator cars and "less-than-carload lot" containers.

One object of the invention is to provide a novel container for the solid carbon dioxide, constructed with a view to collecting heat from a comparatively wide area of the atmosphere of the refrigerated space and preferably from the upper or warmer region of said space; preferably also to collect it rapidly through metal surfaces and to conduct it to the interior of said container through an all metal path.

When the exterior surface of the metal is exposed to the atmosphere directly, its response to changes of temperature of the atmosphere is very rapid as compared with the much slower response of metal containers that absorb heat through heat insulation. The less the exterior insulation and the further the collected heat has to travel through the all metal path, the more closely will the collecting surface tend to follow the temperature of the contacting air rather than that of the refrigerant source. Consequently, the quicker and more effective the response will be.

In certain special cases, where low temperature or a high rate of refrigeration is required, the refrigerant container may be used without any insulation either outside or inside, the solid carbon dioxide resting directly on the metal bottom of the container. On the other hand, interior insulation as by wrapping the blocks of solid carbon dioxide in one or many thicknesses of paper or inserting one or many thicknesses of paper or of corrugated paperboard between the solid and the bottom of the container may be availed of to slow down the rate of sublimation of the solid, thereby increasing the effective refrigerant temperature of the walls of the container and its remote collecting surfaces, without proportionally decreasing the sensitiveness with which said surfaces will collect and deliver the heat.

One important factor is that whatever may be the basic refrigerant evaporation rates thus predetermined, it is seldom possible to avoid formation of frost on the heat collecting surfaces. The lower the temperature of these surfaces, the more frost they are likely to collect, and such frost layer is variable and therefore unreliable exterior insulation tending to make the exterior refrigerant surface vary from approximately the freezing point of water when the frost is very thick, down to say 50° or more below zero F., which may be the temperature of the bottom of the container when it is free from frost.

It will be evident that by having metallic heat conducting flanges and fins of large area extending into contact with relatively remote parts of the atmosphere of the refrigerated space, particularly at a high level therein, the coldest spot will be at the bottom of the container, and that the temperatures will be progressively higher toward the more remote edges of said heat collecting flanges or fins. In a particular case, the latter might be at or above zero F. while the bottom of the metal container would be 50° or more below zero. In such case, the frost formation will be thinnest toward the remote edges, and progressively thicker along the lines of heat flow to the bottom of the container on which the solid carbon dioxide is supported. It will be evident that by this distribution of the insulating frost, the direct heat absorbing effect of the cold bottom of the container may be decreased to or below that of the remote heat collecting surfaces which are frosted much less, or not at all. In practice, it is found that the remote collecting areas seldom collect enough frost to seriously impair their sensitiveness or prevent them from transferring heat at the rates required for evaporating refrigerant and developing refrigerant values at the desired rate.

In some cases we have made the metal of the refrigerant container and heat collectors relatively thin and have effected the high level heat collection by circulating the evaporated gas in conduits, preferably thin and flat, arranged around the upper angles of the ceiling and side walls.

However, in the preferred case, the gas circulating conduits are dispensed with; the metal of the container and its heat collectors is made relatively thick so that the metal will afford substantial heat storage as well as heat collecting capacity; and said collectors are extended as far as may be desired, sometimes to the walls or even downward on the wall.

In any case the gas may be discharged inside or outside the refrigerated space, but preferably outside, either to the exterior atmosphere or into the insulation container between exterior walls of the refrigerator, to there serve as drying and insulating as well as somewhat refrigerant medium.

The above and other features of our invention will be more evident from the following description in connection with the accompanying drawings, in which Fig. 1 is a perspective view of the refrigerating assembly in position in a motor truck, the latter being partly broken away;

Fig. 2 is a plan view showing the elements assembled but removed from the refrigerator chamber;

Fig. 3 is a vertical section taken on the line 3—3 of Fig. 1;

Fig. 4, also a vertical section, is taken on the line 4—4 of Fig. 1;

Fig. 5 represents a detail view of an unassembled duct joint;

Fig. 6 shows the above assembled;

Fig. 7 is a modified form of duct system;

Fig. 8 is a vertical section of Fig. 7 positioned in a refrigerator chamber;

Fig. 9 is a horizontal section of a further modified form;

Fig. 10 is a horizontal section of a slightly different arrangement of Fig. 9;

Fig. 11 is an enlarged plan view, partly in section, of the bunker;

Fig. 12 is a side elevation of the bunker, partly in section;

Fig. 13 is a vertical section, taken on the line 13—13 of Fig. 12;

Fig. 14 is a vertical section taken on the irregular line 14—14 of Fig. 13;

Fig. 15 is an end elevation of a slightly modified form;

Fig. 16 is a perspective view of the refrigerant wrapped in a number of thicknesses of paper or other insulation;

Fig. 17 is a plan view of a bunker, like Fig. 11, but showing a modification;

Fig. 18 is a side elevation of the same, partly in section and showing it secured to the roof;

Fig. 19 is a section on the line 19—19, Fig. 18;

Fig. 20 is a section on the line 20—20, Fig. 18;

Fig. 21 is a perspective view showing the refrigerant supported on a separate layer of insulation;

Figs. 22 and 23 are horizontal sections like Figs. 10 and 9, respectively, but showing various modifications.

In Fig. 1 the refrigerated space is shown as being the body of an ordinary motor truck 2 but is shown in this connection solely for the purpose of illustration. The refrigerating chamber has any desirable number of doors 3 located most conveniently therein and, preferably in the top, there are hatchways 4 and 5 having directly thereunder the openings 6 and 7 through which the refrigerant is charged into the bunker 8.

The refrigerated space is preferably made gas-tight in any conventional manner and we have found it very effective and economical to provide inner and outer gas-tight metallic walls 9 and 10 with any desirable thickness of good insulating material 11, such as kapok or cork, between the said gas-proof walls 9 and 10.

It will be noted that the openings 6 and 7 for charging the bunker are provided with the upstanding walls 15 and 16 extending up into the hatchways 4 and 5, for the purpose of lending rigidity to the structure and providing a means for easily making a gas-tight seal.

In Fig. 1 the assembly is clearly shown in position but by reference to Fig. 2, the detail of the assembly is much more easily understood. The bunker 8 thereof has a plurality of heat collecting extensions including fins 17, extending from the sides and having the largest portion of their heat collecting area, in direct heat-imparting relation to a relatively high level portion of the bunker. The high level heat collecting surface is further increased by extending the top 18 of the bunker beyond the vertical sides 19 to form lateral flanges, and preferably the fins 17, are formed as brackets supporting said flanges and operating as short circuiting, all-metal conducting paths for flow of heat directly to the lower, colder portions of the walls of the bunker. This type of bunker when used alone, i. e., without any auxiliary system such as the ducts shown in Figs. 1 to 8, is very effective and the results obtained thereby were unusually surprising. The structure and advantages of the bunker itself will be explained and claimed more in detail hereinafter.

Referring again to Fig. 2, the solid carbon dioxide within the container 8 will slowly sublime and the cold, heavy gas therefrom will flow downward by gravity through the opening 20 and downwardly extending duct 21 to the lateral duct 22 and, as it becomes warmer and lighter, will rise in the vertical duct 23, whence it will flow through the sections 24 and rearwardly through 25 rising at the far extremity thereof into the relatively wide lateral duct 26, returning through 27, at a relatively high level through the opening 28 and emptying back into the bunker 8. This gives a complete circuit of thermo-circulation, all confined to a high level of the refrigerated space and traversing the warmest portions thereof. Obviously, the size and form of the ducts and duct system can be made to conform to the requirements of the particular refrigerator. Preferably, the bunker is central, as shown, in which case there may be a parallel upflow and return circuit, symmetrical with the one just described.

Preferably near the end of the gas thermo-circulation, where the gas is warmest, a vent or discharge opening 34 is arranged to prevent pressures being built up within the system, by permitting escape of this warmest part of the gas. It may be discharged into the lading, or vented to the exterior, or discharged into the insulation surrounding the refrigerated space in order to take advantage of the unusually good drying and insulating qualities of the gas.

The hatchway, bunker opening and their closures 35, are preferably made of insulating material 36 with a protecting cap 37 of metal or other durable material and are made to fit very closely into the openings so as to prevent any leakage of gas.

In thermo-circulation, the heavy gas naturally starts downward from the opening 20 and the partial vacuum causes downflow of the atmosphere from the section 27, thus making certain that the circulation would be in the proper direction, that is clockwise, according to Fig. 3. By proportioning the size of the vent 34 to make its normal flow capacity take care of the amount of gas produced at the minimum sublimating rate, only a slight increase of pressure, will enable it to take care of higher rates. Hence continuous outflow of gas will prevent any inbreathing of outside atmosphere and avoid acceleration of the sublimation rate of the solid within the bunker, the latter being at all times submerged in an insulating atmosphere of pure gas.

In Figs. 3 and 4 it will be seen that both the bunker itself and the ducts are positioned slightly away from the walls and ceiling, so that practically the entire outer surface of the various elements operate to cool the refrigerated atmosphere by direct conduction. This spacing of the elements away from the ceiling and walls provides the spaces 38 and 39 for complete circulation of atmosphere, above, around and under both the ducts and the bunker.

The bunker can be securely fastened into the ceiling in any conventional manner and the ducts may be supported on the Z bars 40 and kept spaced from the walls by the strips of insulating material 41, the whole supported by the screws or bolts 42. Preferably, the lowermost point of the ducts has the cock 43 to drain the system when the same is washed or when condensed moisture accumulates therein. In order to facilitate this draining the lower edge of the duct section 22 is inclined inwardly from the outer ends.

The speed of the thermo-circulation in the gas conduit depends upon the vertical height of the down and up legs of the conduit. Hence we prefer to provide a joint 23, shown in detail and unassembled in Fig. 5, whereby greater or less lengths of pipe may be interposed. This joint is preferably made by turning back the ends of the downwardly extending part of 24 as indicated at 44 and also turning back the ends of the upwardly extending part of 22 as indicated at 45 then hooking the two oppositely turned ends one within the other and pressing them as indicated at 46 in Fig. 6. The joint thus formed on three sides is then made gas-proof by the solder 47 or in any other conventional manner. The fourth or open side of the joint is closed, gas-tight, by soldering the section 48 thereover. This type of joint also obviates necessity for assembling the entire apparatus outside of the chamber and renders the installing therein relatively simple.

To those skilled in the art, it will readily be understood that by our methods and apparatus heat is conducted through the bunker directly from the refrigerated atmosphere to the refrigerant and the heat from more remote and warmer portions is conducted directly to the bunker through the fins with a further provision of refrigerating and insulating still more remote regions and regions that are normally even warmer than those above referred to. The usual top to bottom thermo currents of the atmosphere of the refrigerated space will be set up but will not be as pronounced in this case as in other refrigerators of this general type, because the relatively great heat absorbing area in the upper or normally warmest region will offset the natural tendency of the bottom to become much colder than the top, and as this difference in temperature between the different regions is what tends to set up such currents they will therefore be greatly minimized.

This structure has unusual advantages over those heretofore employed because the heat absorbing area is distributed over a wide space, which space may include practically all of the ceiling area, this region being the warmest and most difficult to refrigerate. Another pronounced advantage is that the various parts, more particularly those that are easily susceptible to injury such as the ducts, are placed almost entirely out of the path of incoming and outgoing products. By their being in a very high region they will not be subjected to the hazard of further injury due to the jolting or sliding around of the cargo while the vehicle is in motion, this obviates the necessity for erecting a protecting wall between the lading and the ducts, such wall being necessary when a duct system is used wherein the ducts extend down a substantial distance below the ceiling.

Our invention can be used either for frozen or non-frozen products and because of the absence of insulation, in the preferred form, around the bunker itself a very low temperature can be reached in a minimum of time, and by the simple expedient of placing insulation either around the solid carbon dioxide or between it and the metallic bunker, in varying amounts, we can accurately control the heat absorption, thus controlling the sublimating rate of the solid carbon dioxide and still having the advantages of an uninsulated bunker when the same is desirable.

In Fig. 7 a slightly differently arranged bunker 20 and circulatory system is shown. In this structure, we preferably arrange the bunker so that it may be positioned equal distances from the front and back of the chamber, and the dual duct system comprises parallel branches having approximately the same duct area exposed in corresponding locations in the different parts of the refrigerated chamber; by this arrangement an even distribution of refrigerant values is practically assured.

We preferably provide discharge openings 49 and 50 at a low level in the refrigerant container, and, at a relatively high level, is provided the intake openings 51 and 52. By this arrangement of carbon dioxide gas openings, it is made a very simple matter to connect one of the circulatory systems to one discharge and one intake opening while the other set of openings remains plugged; for instance, the duct 56 could communicate with the discharge opening 50, thereby providing a gas circulation from 50 through the ducts 56, 55, 54 and 53, returning to the bunker through the opening 52 and at the same time the other system comprising the ducts 57, 58, 59 and 60 could be removed or disconnected. By this structure, as a whole, is provided a refrigerating system for definitely evenly distributing refrigeration with the alternative of lowering the temperature in one region very appreciably below that of another. If the top of the refrigerator is crowned, as shown in Fig. 8, it may be necessary to incline some or all of the discharge and intake portions of the ducts.

This particular form, in both its heat absorbing function from the upper regions and the limiting of its structural elements to those regions is even more pronounced than in the form first described. Practically the entire apparatus in this case will be well above the normal height to which the chamber will be filled.

In Fig. 8 the assembly is shown as being positioned in any refrigerating chamber 1b. It will be seen by reference to this figure that the ducts 54 and 58 communicate with the transverse duct sections 55 and 59, from which sections the discharge portions 56 and 60 take off the gas from a relatively low level of the bunker 8b.

This arrangement shown in Figs. 7 and 8 has the advantage that it is exceptionally flat in the horizontal plane, thereby doing all of the cooling in the highest part of the refrigerated space, which tends to be the hottest. However, it has the disadvantage that the vertical height of the conduit legs being small, the system affords less active thermo-circulation than the one described above. Hence either the conduits 56 or 60 may be cut off. In such case, the circulation will be forced by the continuously generated gas. In such case, the gas will be permitted to escape from the remote ends of the side conduits through vent pipes 56—a.

In Figs. 9 and 10, we have shown various arrangements for bunkers of refrigerators to be used for various purposes. In either of these forms, the bunkers may be used without the circulatory duct system, but the same can be very easily added thereto for the purpose described in connection with Figs. 7 and 8 and in the manner to be described hereinafter in the detailed description of the bunker.

Referring to Fig. 9, the refrigerator 1c is preferably similar to those described in connection with the other figures, and, in the case of a relatively large space for refrigerating unfrozen products, two of the bunkers 8c can be placed therein, the most convenient arrangement being near the side walls of the space in order to allow for a passageway between the bunkers of the full height of the chamber whereby anyone entering the refrigerator may do so without stooping under the bunkers.

These bunkers are preferably spaced slightly away from the side walls 70 and 71 and approximately the same distance from the ceiling. As in the description already recited, this spacing exposes all of the heat absorbing surfaces of the bunker directly to the refrigerated atmosphere and allows complete circulation of the cold air therein through the spaces 72 and 73, around and over the bunkers. The upraised portions 74 are provided for the purpose of preventing the bunker from being positioned too close to the ceiling and at the same time to present a heavier section through which fastening or tie bolts may be projected for the purpose of securing the bunkers to the ceiling. Holes for this purpose are indicated at 75.

The bunkers are charged through the openings 77 and the gas is vented therefrom through either or both of the vents 78 and if desired discharged through the pipes 79 into the insulation 11c, or to the exterior or into the refrigerated space. The return openings 51c and 52c may be plugged to prevent escape of gas as also may be the discharge openings which are not shown in Figs. 9 and 10. When desirable, the gas may be discharged through a coil or length of pipe or duct within the refrigerated space and so proportioned that it will absorb heat and be at the temperature of the refrigerated space before it is vented into the refrigerated space, the insulation or the outside atmosphere.

Fig. 10 shows a smaller refrigerator and one that would with remarkable ease supply sufficient refrigeration for frozen products, such as ice cream. It comprises the usual gas-tight outer chamber 1d and has arranged therein any desirable number of bunkers 8d arranged so that they will uniformly absorb a maximum amount of heat. In all essential features the bunkers are the same as those already described being arranged for most efficient operation according to the size and dimensions of both the lading space and the bunkers themselves. In this particular instance, the bunkers instead of having their length lengthwise of the refrigerator are arranged so that their lengths are transverse thereto. The gas from one bunker may be vented into the insulation by the pipe 79d and gas from the other may be vented directly into the lading space. The disposition of the gas, however, all depends on the products to be refrigerated and whether or not a circulatory duct system is used. Any convenient distribution may be availed of, through the valves 80d and 81d.

The bunker itself constitutes a distinct forward step in this art. It has enabled us to obtain far greater refrigerating efficiency over the prior art by the use of a much smaller refrigerant container under the same conditions. Its simplicity and the ease with which it may be converted from a refrigerating system acting solely through conduction to one in which an auxiliary gas circulating system may quickly be added is a feature that adds greatly to its value. While some of the details have already been described, we think it would be well for the purpose of clarity and to bring out the novelty in a more definite manner, to here furnish a detailed description.

Fig. 11 is a top plan view broken away at several points to illustrate some of the details in section. In place of galvanized iron, copper or other sheet metal, indicated for the preceding bunkers, this one is preferably made of aluminum and cast at one operation, thus minimizing the cost and doing away with the necessity for labor in assembling different parts. The aluminum, or aluminum alloy is comparatively cheap and is of exceptionally good heat conducting quality. Moreover, the metal is thick enough to afford ample cross-section for flow of heat; also to afford great heat storage capacity, which is another way of saying that, when cold, it represents readily and locally available refrigerating capacity which is effective for absorbing heat when the refrigerated atmosphere is suddenly warmed, as by opening the service doors.

The bunker has the opening 90, to permit of charging of same with solid, and the raised edges or skirt 91 that projects up into the hatchway of any refrigerator but is definitely spaced away from the ceiling any predetermined distance by provision of what might be termed the cross bars 92, these bars or sections being made, say, one-half inch thicker than the balance of the top 93 so that they not only provide for a space of definite thickness between the bunker and the ceiling of the refrigerator, but also offer a stronger portion through which the bunker may be fastened to the ceiling, the fastening being accomplished by the screws or bolts 94 passing through the openings 95.

The bunker is preferably oblong or at least of greater length than breadth and at either the ends or the sides may be placed, at a low level, passages 96 for the exit of gas, when a circulatory duct system is to be used. In such case the flanges 97 may be secured to these openings by means of the bolts 98 being tightened in the bolt holes 99 and the joint being made gas-tight through means of a gasket 100 of rubber or other material suitable to make a gas-tight joint. If it is not desired to drain the gas from the bunker, then the passages 96 may be plugged gas-tight by means of the plugs 101, secured in the same manner as would be the flanges 97.

When the discharge openings 96 are placed in the ends of the bunker, it then becomes most convenient to place the return openings 102 in the sides of the bunker, at a higher level than the discharge openings. These return openings may be provided with either the flanges 97 or plugs 101, in the same manner as the end openings, depending on whether the circulatory gas system is used. Obviously, one discharge and one intake opening can be used for circulation while the other discharge and intake openings may be closed or, if desirable, any three openings may be used or, as we contemplate in a great number of cases, all of the openings will be closed and the gas will be vented to wherever desired through either or both of the vents 108 and 109.

Preferably, on the sides of the bunkers are the heat collecting fins or extensions 110 which start from a point near the bottom of the bunker and extend upwardly to the top and outwardly at least as far as the top itself extends beyond the side walls 111 as indicated at 112 (Fig. 14). The fins 110 which are directly under the return openings 102 are of slightly less area because of the return passages, said passages being formed by using the top of the bunker as the upper side of the conduit and positioning the lower side 113 (Fig. 13) the necessary distance below the top 93 thus, necessarily, diminishing the height of the fins directly under these return passages.

In Fig. 12, the bunker is shown in position in a section 114 of the roof of a refrigerator, the hatchway thereof being closed, substantially gas-tight, by a closely fitting top 115. It will be seen how the raised portions 92 provide a circulating space 116 between the ceiling and the bunker.

In the inside of the bottom of the bunker may be the raised sections 117 which may take the form of cross-grids or both cross and lengthwise or may be any other convenient form just so they will offer resistance to the sliding motion of the refrigerant caused by the jarring or jolting of a truck or refrigerator car.

The openings shown at 118 and plugged by the plugs 119 are placed at any convenient location and may be used for hooking-up an automatic temperature control, valve operator, etc.

In Fig. 15 is shown a slightly modified form of bunker. Instead of having a plurality of comparatively small heat collecting fins extending from the sides, as in the preferred form, we do what amounts to laterally elongating, i. e., making substantially wider, the top 93 as indicated at 125, but in all other respects, the two forms are substantially the same. This construction has the further advantage of having even a greater heat absorbing area nearer the ceiling, in fact practically adjacent it but still leaving an interspace of sufficient thickness to afford free circulation of the refrigerated atmosphere completely around the bunker.

In Fig. 16 is shown a cake or block 126 of solidified carbon dioxide wrapped in any desired number of layers of ordinary newsprint 127 or any other suitable insulation. It will be readily understood that when a refrigerant of such intense coldness as solid carbon dioxide, at approximately $-110°$ F., is used for producing ordinary refrigerating or freezing temperatures, some precautions must be taken to prevent over-refrigeration of the products which not only might spoil them but which is also an unnecessary waste of refrigerant, consequently where exterior insulation is not provided between the bunker and the refrigerating space, it may be provided between the refrigerant and the bunker, or both. When insulation is applied to the bunker, either inside or outside, it is generally permanent or at least semi-permanent but is just as effective insulation, in some cases more so, when it is applied to or wrapped around the solid. It is much more effective when applied to the solid in the case where the solid would not otherwise be maintained in an atmosphere composed substantially of its own gas, because paper or almost any insulating material offers sufficient resistance to the passage there-through of the gas to hold a high concentration around the solid. Since the most available source of heat is the bottom of the bunker on which the refrigerant rests, one or more pieces of corrugated paper-board, or other insulating material, may be placed under the refrigerant as indicated, at 127a, Fig. 21; and in such case the paper wrapping may be dispensed with, if desired.

Figs. 17 to 20 show a bunker in all respects similar to that shown in Figs. 11 to 14, except that the openings and flanges for clamping on conduits of a gas circulating system, as at 96 and 102, have been omitted and taps for drawing off excess gas at a high level of the bunker have been added as at 119a. Otherwise, said Figures 17 to 20 are similar and have the same reference numerals as 11 to 14.

This unit is particularly designed for use in connection with all metal heat collectors and may be used in various ways as in Figs. 22 and 23.

In Fig. 22, the bunker of Figs. 17 to 20 is shown as varied by having the laterally extending flanges 93x as much wider as may be desired. Also the end of the bunker is flanged as at 93y in addition to the side flange shown in the other figures. In the upper part of Fig. 22, we have shown how instead of widening integral flanges, supplemental flanges 93z may be bolted or riveted in firm heat conducting contact with the flanges 93. These supplemental flanges may be extended to the side walls of the refrigerator, as shown, and the outer edges may be turned down and secured to said side walls.

In Fig. 23, the arrangement is like that shown in Fig. 9, except that the bunkers are supposed to be of the construction shown in Figs. 17 to 20, and the entire distance between them is abridged by a supplemental sheet metal piece 93z.

In all cases, the sheet metal extension may be sheet aluminum or sheet copper, or any other desired metal.

In both Figs. 22 and 23, the gas taps 119a are shown as connected to gas discharge pipes, 79x, representing a pipe discharging into the insulation through cock 80x and 79y representing a pipe discharging gas to the exterior and controlled by a three-way cock, 80y, whereby the gas may also be discharged into the refrigerated space.

No claim is made herein broadly or specifically to the refrigerant container per se of this invention, or to such container mounting relative to the space to be refrigerated, or to a method of refrigerating by the use of said container, unless such refrigerant container is combined or associated with a refrigerant gas circulating system, or such container includes provision for discharge of refrigerant gas from and return of such gas to the container, or the method of refrigeration includes the use of circulating refrigerant gas. Claims to the refrigerant container per se and to its mounting relative to the space to be refrigerated, or to a method carried out with said container, are presented and included in our application Serial No. 535,784, entitled "Refrigerating apparatus and method", filed May 7, 1931, as a division of the present application.

We desire to point out that our invention is susceptible of many changes, a number of which have been pointed out, and we do not mean to limit the scope of the specification or claims by the particular wording or drawings here illustrated.

We claim:

1. The method of uniformly distributing the refrigerating effects of solid carbon dioxide in an enclosed space which includes establishing a refrigerating source by positioning a quantity of solid carbon dioxide in a confined area arranged in uninsulated relation to said space; conducting heat through the confined area proper to the solid carbon dioxide from the atmosphere adjacent said confined area; conducting heat to said solid from more remote portions of said space through heat conducting zones more efficient than the gases in the refrigerated space extending from said confined area to said more remote portions and conducting heat from still more remote portions of said space by circulating the cold gas sublimed by said solid carbon dioxide through ducts leading from said confined area in the upper regions only of the enclosed space.

2. The method of uniformly distributing the refrigerating effects of solid carbon dioxide in an enclosed space which includes establishing a refrigerating source by positioning a quantity of solid carbon dioxide in a confined area arranged in uninsulated relation to said space; conducting heat through the confined area proper to the solid carbon dioxide from the atmosphere adjacent said confined area; conducting heat to said solid from more remote portions of said space through heat conducting zones more efficient than the gases of the refrigerated space extending from said confined area to said more remote portions and conducting heat from still more remote portions of said space by circulating the cold gas sublimed by said solid carbon dioxide, through ducts leading from the lower portion of said confined area to said still more remote portions and returning to said confined area at the upper part thereof.

3. The method of uniformly distributing the refrigerating effects of solid carbon dioxide in an enclosed space which includes establishing a refrigerating source by positioning a quantity of solid carbon dioxide in a high level confined area arranged in uninsulated relation to said space; conducting heat from the upper portions of said space to said confined area through metallic fins; conducting heat from the most remote portions of the upper part only of said space by a confined circulation of gas.

4. A refrigerating apparatus comprising an insulated chamber, a container for solid carbon dioxide at a high level therein and uninsulated from the atmosphere to be refrigerated, said container being of greater length than width, and having high heat conducting extensions extending from the longer sides of said container, and from a point near the top of said container but slightly below the ceiling of said chamber, said container having a low level gas take-off connection and a high level gas return connection.

5. A refrigerating apparatus comprising an insulated chamber, a container for solid carbon dioxide at a high level therein and uninsulated from the atmosphere to be refrigerated, said container having heat collecting extensions extending therefrom to comparatively remote portions of said chamber and being above the bottom of said container, gas circulating ducts leading from said container to still more remote portions of said chamber and returning to said container.

6. A refrigerating apparatus comprising an insulated chamber, a container for solid carbon dioxide at a high level therein and uninsulated from the atmosphere to be refrigerated, said container having heat collecting extensions extending therefrom to comparatively remote portions of said chamber and being above the bottom of said container, gas circulating ducts leading from a low level of said container to still more remote portions of said chamber and returning to said container at a relatively high level.

7. A refrigerating apparatus comprising an insulated chamber, a container for solid carbon dioxide at a high level therein and uninsulated from the atmosphere to be refrigerated, said container having heat collecting extensions extending therefrom to comparatively remote portions of said chamber and being above the bottom of said container, a gas circulating duct extending from the bottom of said container and acting as the downflow leg of a thermo-circulation, communicating with a circulatory duct system acting as the upflow leg of said circulation, said system terminating at a relatively high level of said chamber.

8. A refrigerating apparatus comprising an insulated chamber, a container for solid carbon dioxide at a high level therein and uninsulated from the atmosphere to be refrigerated, said container having heat collecting extensions extending therefrom to comparatively remote portions of said chamber and a passage for the circulation of gas leading from a low level at one end of the bunker to a circulatory system in relatively remote regions of said chamber and returning at the other end of said container at a relatively high level.

9. A metallic container for refrigerating with solid carbon dioxide having an opening for access to the interior thereof, heat collecting extensions extending from said container, means therein to permit discharge from and return to said container of the gas sublimed by said solid carbon dioxide.

10. A metallic container for refrigerating with solid carbon dioxide having an opening for access to the interior thereof, heat collecting extensions extending from said container, and means in a low region of said container for discharge the gas sublimed by said solid and means in a high region thereof for return of said gas.

11. A metallic container for refrigerating with solid carbon dioxide, said container being of greater length than width, having heat collecting extensions extending therefrom, a means arranged in the ends of said container for discharge of the gas sublimed by said solid and a means arranged in the sides thereof for the return of said gas.

12. In combination, a metallic container, for refrigerating with solid carbon dioxide, having heat collecting extensions extending therefrom with a means for discharging from the container and returning thereto the gas sublimed by said solid carbon dioxide, said means being arranged so that they may be open for discharge and return of said gas or closed against such discharge and return.

13. A refrigerating container comprising a container body having a commodity receiving space, a ceiling, a refrigerant container chamber in the upper portion of the body pendent from said ceiling and spaced from the walls of the body, said chamber having an inlet thereto extending downward through the ceiling and said space having an inlet thereto in one of the walls of the body, closures for said inlets, a fluid circulating duct in said upper portion of the body extending around the walls thereof and about the refrigerant containing chamber in spaced relation thereto, and outlet and return connections between said chamber and said duct.

14. A refrigerating container comprising a container body having a commodity receiving space and an inlet to said space in one of the vertical walls thereof, a wall at the top of said space, a refrigerant containing chamber pendent from and supported by said wall, a fluid circulating duct extending horizontally in the body about and in spaced relation to the chamber, an inlet to the chamber extending thereto through the top wall, and outlet and return connections between said duct and said chamber.

15. A refrigerating container comprising a container body having front, rear and side walls and a ceiling, a refrigerant containing chamber in the body pendent from the ceiling and having similar walls spaced from the walls of the body, an inlet to the chamber extending thereto through the ceiling, a closure for said inlet, a fluid circulating duct lining the container walls and surrounding the chamber in spaced relation thereto in said space, and outlet and inlet connections between the chamber and duct extending across the space between said chamber walls and said body walls.

16. A refrigerating container comprising a container body having front, rear and side walls, and a ceiling, said front wall having a doorway therein, a closure for said doorway, a refrigerant containing chamber in the body pendent from the ceiling and having similar walls spaced from the walls of the body, an inlet to the chamber extending thereto through the ceiling, a closure for said inlet, a fluid circulating duct in the space lining the container walls and surrounding the chamber in spaced relation thereto, and outlet and inlet connections between the chamber and duct extending across said space.

17. A refrigerating container having a commodity storage space, a refrigerant containing chamber in the top of the body above said space, said chamber and space being provided with inlets and said chamber being spaced from the walls of the body, closures for said inlets, a fluid circulating duct of restricted cross-section and of a depth substantially equal to that of the refrigerant containing chamber lining the walls of the body and extending around the same in spaced relation to the refrigerant containing chamber, and outlet and return connections between said chamber and said duct extending across the space therebetween.

18. A refrigerating container comprising an oblong, rectangular container body having a commodity receiving space, an inlet to said space in one of the vertical walls thereof, a ceiling wall at the top of said space, a refrigerant containing chamber of oblong, rectangular form pendent from and supported by said ceiling wall, said chamber having side and end walls spaced from the corresponding walls of the container body, a circulating duct extending horizontally in the body about its walls and in spaced relation to the walls of the chamber, an inlet to the chamber extending thereto through the top wall, and outlet and return connections between said body and said chamber extending across the space between the chamber and duct, said connections comprising a conductor between each end of the chamber and the corresponding portions of the duct.

19. A refrigerating container comprising an oblong, rectangular container body having front, rear and side walls defining a commodity receiving space occupying substantially the entire internal area of the body and a ceiling, one of said walls of the body being provided with an inlet to said commodity receiving space, a closure for said inlet, an oblong, rectangular refrigerant containing chamber in the body pendent from the ceiling and having similar walls spaced from the walls of the body, an inlet to the chamber extending thereto through the ceiling, a closure for said inlet, a fluid circulating duct lining the container walls and substantially co-extensive in depth with and surrounding the chamber in spaced relation thereto in said space, and outlet and inlet connections between the side and end walls of the chamber and corresponding portions of the duct extending across said space.

20. The method of controlling the distribution of refrigerant effects of solid carbon dioxide, which includes establishing a refrigerating source by positioning a quantity of solid carbon dioxide within a confined area; conducting the gas from said solid carbon dioxide into heat exchange relation with a space to be refrigerated at the upper region of said space in areas horizontally remote from the confined space and returning the gas to the confined area; and applying heat to said carbon dioxide through the wall defining the confined area and through a plurality of heat conducting zones substantially exceeding the heat conducting efficiency of the gases of the space to be refrigerated which extends from the sides of said confined area and being substantially at right angles with said confined area.

21. The method of controlling the distribution of refrigerant effects of solid carbon dioxide, which includes establishing a refrigerating source by positioning a quantity of solid carbon dioxide within a confined area arranged in intimate heat exchange relation with the space to be refrigerated, to effect a heat exchange action at least equivalent to the degree of heat exchange which would be effected through a non-insulated metallic wall; conducting the gas from said solid carbon dioxide into heat exchange relation with the space to be refrigerated at the upper region thereof only and discharging the gas into the confined area; and applying heat to said solid carbon dioxide through the wall that defines the confined area and through a plurality of heat conducting zones substantially exceeding the heat conducting efficiency of the gases of the space to be refrigerated which extends from the sides of said confined area and being substantially at right angles with said confined area above the bottom thereof and in the uppermost and horizontally remote regions of said space to be refrigerated.

22. In combination, a metallic container for refrigerating with solid carbon dioxide, having heat collecting extensions extending therefrom with openings for discharging from the container and returning thereinto the gas sublimed by said solid carbon dioxide, and means being arranged so that the openings may be open for discharge and return of said gas or closed against such discharge and return.

CHARLES L. JONES.
HOWARD S. McILVAIN.